June 25, 1940.　　　　　C. A. OTTO　　　　2,205,930
PNEUMATIC CONTROL SYSTEM
Filed Feb. 27, 1939　　　　2 Sheets-Sheet 1

Inventor
Carl A. Otto
By
Dodge
Attorneys

June 25, 1940.  C. A. OTTO  2,205,930
PNEUMATIC CONTROL SYSTEM
Filed Feb. 27, 1939  2 Sheets—Sheet 2
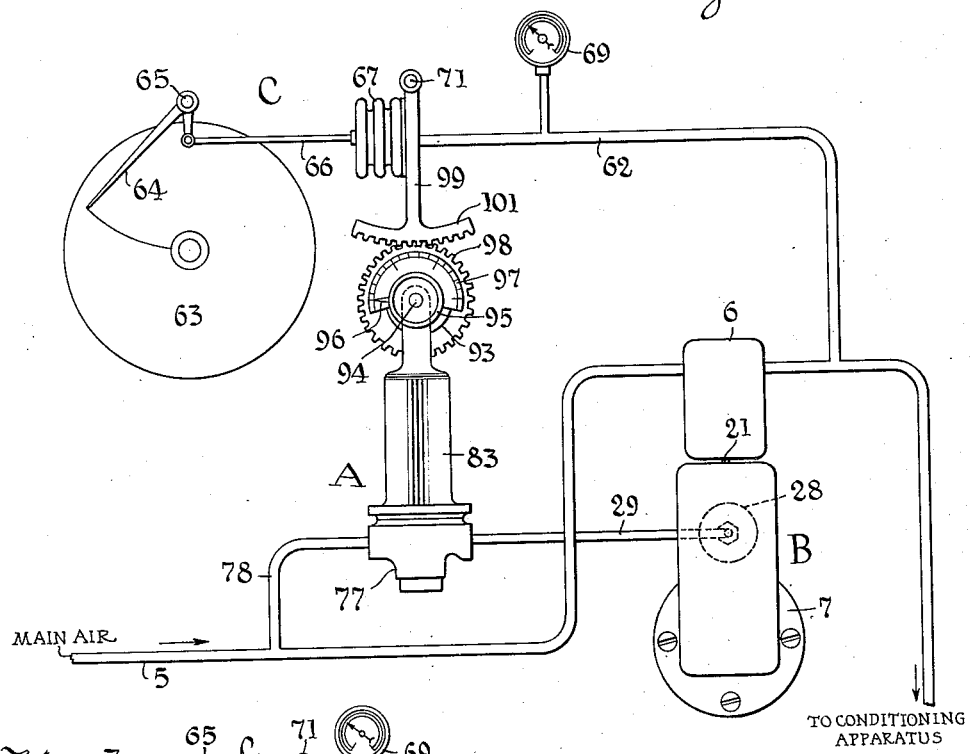
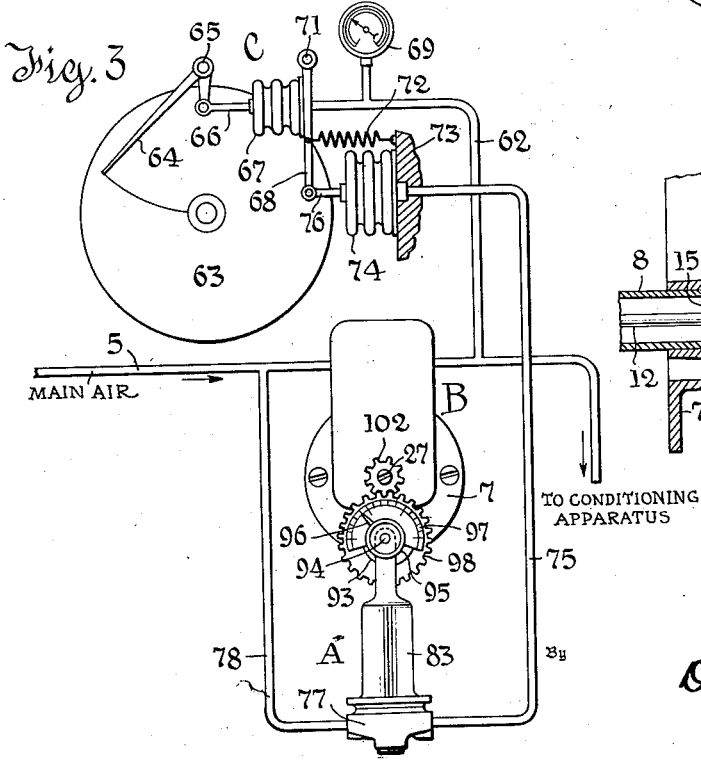
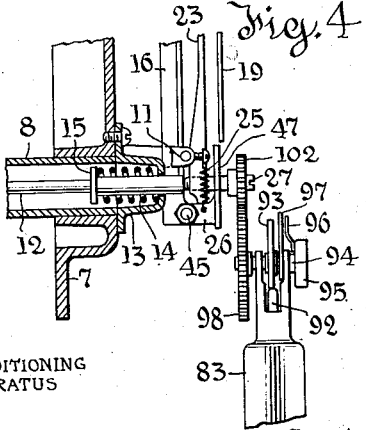
Inventor
Carl A. Otto
Attorneys Patented June 25, 1940

2,205,930

UNITED STATES PATENT OFFICE 2,205,930

PNEUMATIC CONTROL SYSTEM

Carl A. Otto, Milwaukee, Wis. assignor to Johnson Service Company, Milwaukee, Wis., a corporation of Wisconsin Application February 27, 1939, Serial No. 258,804

7 Claims. (Cl. 236—79)

This invention relates to pneumatic control systems, and more particularly to pneumatic telemetering systems designed to coordinate the readjustment of a recording instrument with changes in the setting or adjustment of an associated conditioning or other apparatus for controlling a variable physical quantity.

In the prior art electrical telemetering systems have been used for indicating various physical conditions at a point remote from that where such condition is sensed or controlled. Such electric systems are highly developed and function effectively in relations where electric circuits can be employed safely and without adversely affecting installations already in existence. In certain locations, such for example as in the operating rooms of hospitals, where explosion hazards exist, it becomes unsafe to use electric controlling circuits for telemetering. Inasmuch as penumatic control apparatus, particularly as applied to the control of temperature and humidity, is highly developed and in common use, it becomes desirable to utilize such existing apparatus as a telemetering means which offers no explosion hazards.

While pneumatic telemetering systems have been proposed, prior art schemes have been faulty either because of the highly sensitive character of the apparatus requiring careful adjustment and frequent servicing, or because the response of the indicating apparatus was so sluggish as to make the mechanism impractical.

The present invention proposes to remedy existing faults in pneumatic telemetering systems, and to accomplish substantially all the results which are characteristic of electric telemetering systems, with none of the disadvantages.

In pneumatic apparatus of the type to which the present invention relates, it is usual to employ branch line pressures which vary from zero to fifteen pounds per square inch. In order to obtain sufficient sensitiveness in such systems so that controlled apparatus may have substantial pressure available for operation, the means provided must be such that the slight changes in the condition or quantity sensed shall produce substantial changes in branch line pressures. The present invention accomplishes this result for the first time as applied to penumatic telemetering systems and, for purposes of illustration, the invention will be described as applied to conditioning apparatus. It is to be understood, however, that it may find application to the telemetering of temperature, pressure, relative humidity and other physical conditions, atmospheric or otherwise, requiring accurate indications at a point remote from the point where such condition is sensed or controlled.

In the drawings, the present invention has been illustrated as applied to telemetering systems associated with air conditioning apparatus in which a factor such as temperature is to be sensed, and a record made at a point remote from the point where such quantity is sensed.

Fig. 2 is a modified form of the invention in which the device for varying the control point is located in proximity to the recording instrument.

Fig. 3 is a further modification in which the device for varying the control point is associated with the sensing device; and Fig. 4 is a partial section of the control point adjusting device shown in Fig. 3.

Figure 1:
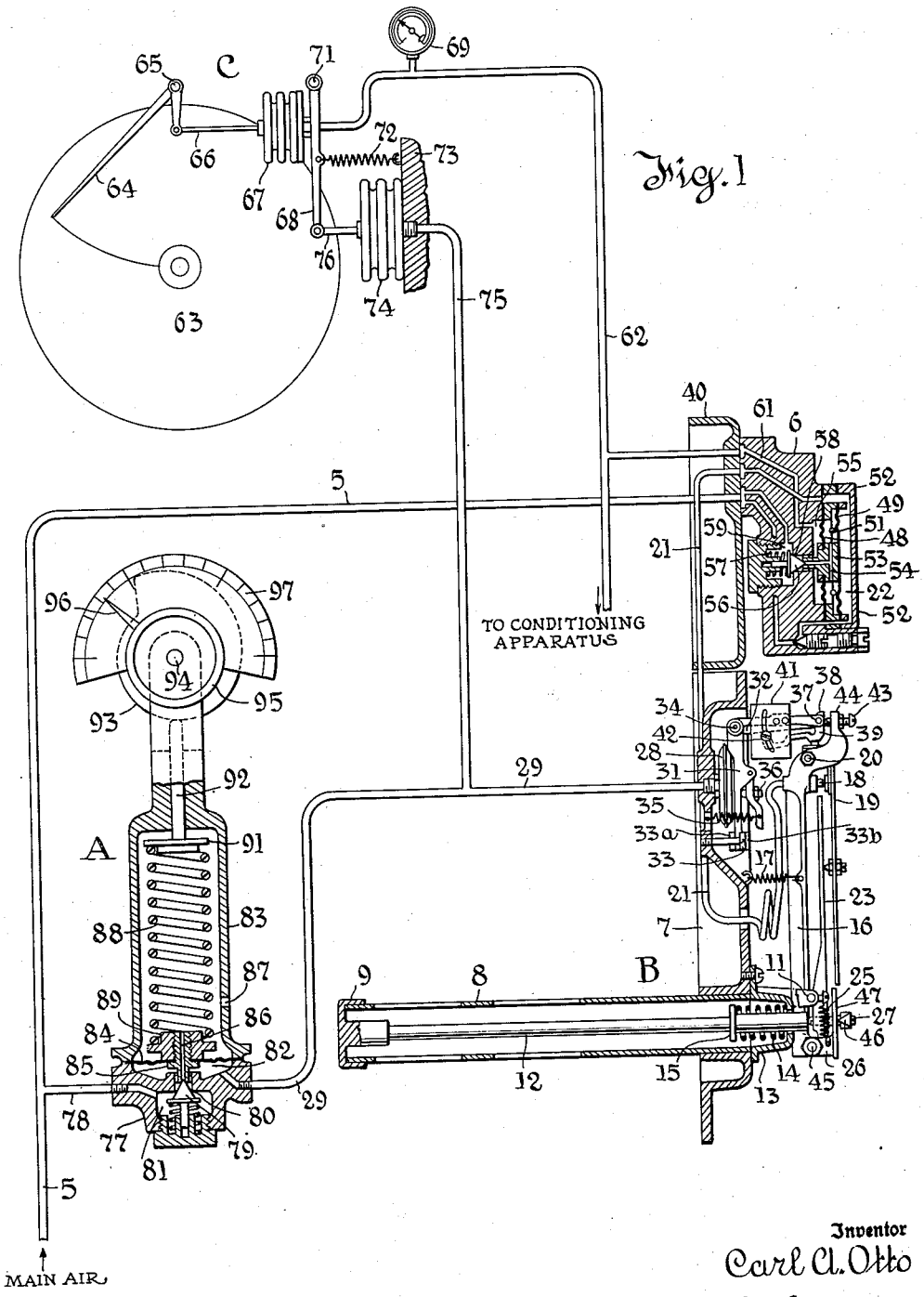
Figure 1 shows one form of apparatus embodying the invention, and wherein the mechanism for varying the control point of the sensing device and simultaneously readjusting the recording instrument is located at a point away from both the instrument and the sensing device, the various instruments being shown in section so as to show their interior construction.

In Fig. 1 of the drawings, the invention is illustrated as applied to a system in which conditioning apparatus, for example, apparatus for controlling the temperature of the atmosphere within an enclosure, is connected to recording apparatus located at a remote point and arranged to give a continuous accurate indication of just what temperature the conditioning apparatus is supplying. As indicated above, the conditioning or equivalent apparatus may be used to control quantities other than temperature, but for purposes of the present description it has been assumed that temperature is the factor under control.

As illustrated in Fig. 1, the source of pressure fluid designated "main air" supplies pressure fluid such as compressed air to a plurality of units, namely a pressure controlling valve A, a remote control thermostat B having an associated relay, and a recording device C. In the arrangement of Fig. 1, it will be assumed that the device B with its relay is located in the vicinity of the conditioning apparatus to be controlled, while the device A is located at a point remote from both the controlling instrument B and the recording instrument C.

The instrument B may take a variety of forms, but for purposes of this description it will be described as comprising a so-called intermediate acting thermostat such, for example, as that described in the patent to Otto, No. 2,009,675, granted July 30, 1935. Such instruments may be caused to operate from a main line pressure of fifteen pounds per square inch and to deliver branch line pressures varying from zero to fifteen pounds per square inch. The pressure in the branch line of such instruments is a function of the deviation of the temperature from a certain predetermined value which may be conveniently referred to as the setting point or control point of the instrument. The control point of such an instrument is adjustable periodically to meet varying conditions, and it is highly essential that the apparatus be so arranged that the recording instrument shall give an accurate indication of what temperature the plant is delivering, that is, the recording device must respond accurately to adjustments made in the control point of the thermostat and by mechanism which is operative automatically in response to changes in that control point and without an inspection or checking of any other instrument.

Pressure from main line 5 is delivered through relay 6 to the thermostat, which thermostat in turn varies the reading of the recording instrument C and provides means for readjusting the instrument C in accordance with changes in the adjustment of the thermostat.

The instrument B comprises a base 7 for supporting the valve mechanism and includes a thermostatic couple made up of a relatively expansible tube 8, fixed at one end in the base 7 and capped at the other end at 9, and a relatively inexpansible rod 12. The forward end of rod 12 is guided by the member 13 through which it may slide longitudinally as the member 8 expands and contracts with changes in temperature. A compression spring 14 reacts against a collar 15 to hold the rear end of rod 12 against the cap 9.

Pivoted at 11 on member 13 is a yoke or lever 16 drawn toward the base 7 by a spring 17. Member 16 carries a leak port 18 cooperating with a movable lid 19 and connected through pipe 21 to the controlling chamber 22 of relay 6. The lid 19, which is pivoted at 20 to the member 16, responds to pivotal movement of arm 23 which forms a part of a yoke 26 pivoted at 45 to the member 16. This arm 23 carries an adjusting screw 27 which contacts with one end of the rod 12 and is biased into contact with the end of that rod by a spring 25 connected between the yoke 26 and the member 13. The arm 23 cooperates with a stop pin adjustably carried in a slotted arm forming a part of the leak port lid 19. The setting of the adjusting screw 27 is indicated by a pointer 46 cooperating with a scale 47 carried on the yoke 26.

In operation with a given control point adjustment, movement of the thermostat will vary the position of lid 19 with respect to leak port 18 and thus establish varying pressures in controlling chamber 22 of relay 6. When, however, the control or setting point of the instrument is to be changed, it is necessary to perform other adjustments and this is provided for by means of a pneumatic motor operating through a shiftable cam to vary the relation of the leak port 18 with respect to its lid 19. The mechanism for performing this adjustment comprises a diaphragm cell 28 to and from which pressure fluid is admitted and exhausted by suitable means such as a pilot line 29 connected to both the recorder and the readjusting instrument A. The cell 28 is carried by the base 7 and reacts against a plate 31 forming one arm of a bell crank lever, the other arm of which appears at 32. The motion of plate 31 in both directions is limited by a stop screw 33 which is adjustable to vary the position of its head with respect to the fixed stops 33a and 33b. The bell crank is pivoted at 34 and its plate 31 is biased towards the base 7 by a tension spring 35 attached at one end to the base, and at the other end to an arm which is attached to the plate 31 and carries an adjusting screw 36 for varying the tension of spring 35.

Arm 32 carries pivoted to it at 37 a cam block 38. By tilting block 38 on its pivot 37, the obliquity of the cam face to the path of pivot 37 may be varied, and this adjustment is fixed by clamping an arm 39 integral with block 38 in a slot in sector plate 41 by a screw 42. The front or cam face of block 38 reacts against thrust screw 43 mounted in a lug 44 carried by member 16. Screw 33 with its associated lugs limit the motion of the bell crank but the obliquity of the cam face of block 38 determines how far member 16 will be caused to shift by such motion of the bell crank.

The instrument just described is capable of producing varying branch line pressure in accordance with varying conditions, be they temperature, pressure, humidity, or the like. The branch line pressure variations are transmitted through branch line 21 connected with leak port 18, and it is an indication of these pressure variations which are to be recorded on the instrument C. Although this instrument might be connected directly to the instrument B, it will in most instances be necessary to provide an intermediate relay in order to get sufficient power to operate the recording mechanism. In the illustration such a relay has, therefore, been included in the form of relay 6 embodying substantially the mechanism described and claimed in Otto Patent No. 1,500,260, granted July 8, 1924.

For purposes of the present specification, a brief description of the relay 6 will be sufficient. It may conveniently comprise a base 48 carrying a body including two diaphragms 48 and 49 of unequal areas and having a space between them vented at 51 to atmosphere. The chamber 22 formed between the outermost diaphragm 49 and the cover 52 of the instrument is connected to the branch line 21 of instrument B as already noted. A hub 53 carried jointly by the two diaphragms and forming a communication 54 between them and the inner chamber 55, controls the flow of air from this chamber to the space between the diaphragms and thence to atmosphere. The inner end of the hub 53 also acts against a conical admission and exhaust valve 56 of conventional type biased by a spring 57 to the right hand position in which it seats at 58. The chamber 59 formed adjacent the enlarged portion of the valve is connected to line 5 from which it receives main line pressure.

The chamber 55 is connected through duct 61 with pipe line 62. It will be apparent that since the diaphragms 48 and 49 are of different cross sectional areas, the variations in pressure occurring in chamber 22 and resulting from variations in pressure in line 21 will cause an amplification to be made of the pressure supplied through pipe 21 which is connected to the recording instrument. When the pressure within chamber 22 is low enough to cause hub 53 to move away from the valve 56, pressure from chamber 55 will exhaust rapidly to atmosphere through openings 51 and thus facilitate discharge of air upon a return motion of the pneumatically operated recording mechanism now to be described.

The recording instrument C may conveniently include the usual movable chart 63 having a cooperating recording pen arm 64 pivoted at 65 and adapted for actuation through arm 66 connected to bellows 67. The bellows 67 is carried by an arm 68 and is supplied with pressure fluid from line 62 to which it is connected, the pressure being indicated by a gauge 69. The arm 68 pivoted at 71 is biased to its right hand position by a spring 72 connected between the arm 68 and a fixed abutment 73. The abutment 73, in addition, carries a readjusting bellows 74 supplied with pilot line pressure through pipe 75 connected to line 29 which also supplies the diaphragm cell of instrument B. Bellows 74 is pivotally connected to the free end of arm 68 by an arm 76.

The recording mechanism may be stated briefly as follows: With the bellows 74 deflated and arm 68 biased to its extreme right hand position by spring 72, variations in pressure in line 62 will expand or contract bellows 67, transmitting those variations to the recording pen arm 64 and thus varying the record produced on the chart 63. When the control or setting point of instrument B is varied by changing the pressure in pilot line 29 and hence in diaphragm cell 28, this same pressure will be communicated through line 75 to bellows 74 to change the initial position of arm 68 and thus the base of bellows 67 which it carries. In this way, the starting point of pen arm 64 will be varied to correspond to each readjustment of instrument B and will produce all further indications in the normal manner as the pressure varies in line 62.

As pointed out above, it will be found convenient in many installations to locate the setting point control instrument at a point remote not only from the instrument B, but likewise from the recorder C. With such an arrangement, the instrument A can be adjusted manually to transmit predetermined varying pressures through pilot line 29, and thus to change the setting of instrument B as well as to vary the pressure in bellows 74 associated with instrument C. Although the instrument A may take various forms, one satisfactory and convenient structure will be described for purposes of illustration.

Since the instrument A consists primarily of manually operable mechanism for establishing predetermined pilot line pressures from a constant pressure main line supply, it is connected both to the pilot line 29 and to the main line 5. It may comprise a housing including a base 77 and a body 83 connected at 78 to main air supply 5. A spring biased inlet valve 79 disposed in chamber 81 in the base controls the supply of air to the branch line 29 connected to a chamber 82. This valve has a conical face which may seat at 80 to isolate the chamber 81 and it may also seat against and seal an opening 86 in a hub 85, later to be described.

Interposed between the base 77 and the body 83 is a diaphragm 84 which defines the chamber 82 already mentioned. The diaphragm 84 carries a hub 85 containing an exhaust channel 86 communicating with the chamber 81 and the space above the diaphragm 84. The space above the diaphragm is vented to atmosphere at 87 and contains a spring 88 having its lower end resting on a spring seat 89 rigidly connected to the hub 85. Resting against the top of spring 88 is a second seat 91 carrying a pin 92 engaging a rotatable cam 93. Cam 93 is carried by shaft 94 mounted in the housing 83 and having a hand wheel 95 by means of which it may be actuated to vary the loading of spring 88. A pointer 96, movable with the hand wheel, cooperates with a fixed scale 97 to indicate what pressure is established in the pilot line by varying the loading of the spring.

The operation of the device A is as follows: Whenever valve 79 is moved off its seat by loading of spring 88, flow of air from chamber 81 through opening 86 is prevented by the valve 79. Main line air then flows from pipe 78 to chamber 81 and around the valve 79 into the chamber 82 to the pilot line 29. This flow continues until the pressure established in chamber 82 is sufficient to balance the loading of spring 88 at which time the hub 85 is moved out of engagement with the valve 79, and any further pressure supplied to chamber 82 is dissipated through opening 86 to atmosphere at 87 to maintain the pressure in chamber 82 and pilot line 29 at the value determined by the loading of spring 88. When the diaphragm 84 becomes balanced and by dissipation of any excess fluid through opening 86, pressure in chamber 82 becomes established at the selected value and valve 79 engages its seat 80 to prevent further entry of fluid into chamber 82 until such time as further adjustment may be made in the loading of spring 88, that is chamber 81 becomes isolated from chamber 82 and no fluid can escape around the valve 79. The parts are so arranged that when diaphragm 84 occupies its normal position, valve 79 engages the seat in the hub 85 to prevent loss of fluid. Whenever the pressure of spring 88 predominates over that of the fluid in chamber 82, opening 86 is sealed by valve 79 and chambers 81 and 82 are in free communication. Whenever pressure in chamber 82 predominates over that of spring 88, valve 79 seats at 80 but is out of engagement with hub 85 to dissipate pressure in chamber 82.

The operation of the complete system shown in Fig. 1 may be stated briefly as follows: The instrument B controls the conditioning apparatus in accordance with the setting point established, and pressure supplied to the instrument C through branch line 62 gives a record of the conditions which are being established by the instrument B. Whenever it is desired to change the setting point of instrument B, hand wheel 95 is rotated to load the spring 88 and thus establish in the pilot line 29 any desired pressure to produce desired response of instrument B.

Since the pilot line 29 not only operates the diaphragm cell 28 in instrument B, but also supplies pressure through line 75 to bellows 74, the parts of instrument C are readjusted in accordance with the new setting or control point of instrument B, and hence instrument C accurately records conditions which are being established or controlled by instrument B regardless of what setting point is chosen, and in exact accordance with those conditions no matter what the manual setting of instrument A may be. In other words, the single means comprising the device A accurately adjusts the instrument B, and at the same time readjusts relatively the scale and pointer of instrument C to ensure an accurate response of instrument C at all times.

In Fig. 1, it has been indicated that the device

A is located at a point remote from both the instruments B and C, but under certain conditions it may be desirable to locate the instrument A in proximity to the instrument C. Consequently, by such an arrangement the instrument A may be manually adjusted to establish a predetermined pressure in line 29, the instrument C being readjusted at the same time that instrument B has its setting point changed. Such an arrangement is shown in Fig. 2 of the drawings.

Referring to Fig. 2 of the drawings, the instruments A, B and C and their connections are substantially those which have already been described. Consequently, reference characters in Fig. 2 are duplicated where the parts correspond to those already described. The control of instrument B with its associated relay 6 takes place in the manner which has already been set forth, but the readjustment of instrument C is not performed pneumatically, but mechanically. The shaft 94 which carries the handwheel 95 and its cooperating pointer, also carries a gear 98 adapted to mesh with the teeth on a curved sector plate 101, carried by the lower end of depending arm 99. The arm 99 forms the base for bellows 67 and, with the exception that it is provided with the gear sector, may have substantially the form of the arm 68 of Fig. 1. As a consequence of this arrangement, any movement of handwheel 95 to vary the loading of spring 88 simultaneously moves the sector plate 101 to the right or to the left to vary the initial or starting position of arm 99. In other words, any movement of handwheel 95 to change the setting point of instrument B, simultaneously readjusts the pen arm 64 with respect to its chart 63. Inasmuch as the variation in the control point of instrument B takes place in the manner already described in connection with Fig. 1, repetition is believed to be unnecessary.

A further embodiment of the invention which may, under some circumstances, be desirable is that shown in Fig. 3 wherein the instrument A is shown directly connected to the instrument B, the instruments A and B being remotely located with respect to instrument C.

In Fig. 3, the arrangement of the recording instrument C is the same as that described with respect to Fig. 1, and the pen arm and chart have their positions readjusted each time that the control point of instrument B is varied. The instrument A is, however, geared directly to the dial screw of instrument B, and acts by a direct mechanical connection to change the setting or control point of the instrument.

In Fig. 3, the reference characters used in connection with Fig. 1 have been repeated where appropriate. Further description of instruments A and C will be unnecessary except to say that the shaft 94 of instrument A carries a gear 98 as in Fig. 2. This gear meshes with a pinion 102 carried by the adjusting screw 27 of instrument B. Whenever handwheel 95 is rotated to change the loading of spring 88 of instrument A, the gear and pinion 98 and 102 change the setting or control point of instrument B by direct mechanical connection while the readjustment between the pen arm and chart of instrument C is performed pneumatically as in Fig. 1.

In the form of the invention shown in Fig. 3, illustration of the relay device 6 has been omitted and it is to be understood that it may or may not be included, depending upon the amount of power required to operate the instrument C.

The operation of the system shown in Fig. 3 will be apparent without further explanation.

Although it is known in the prior art to provide pneumatic telemetering systems, no simple and precise mechanism capable of giving accurate indications has, to my knowledge, been produced prior to the present concept. The mechanism disclosed and claimed herein is capable of reproducing at the recording instrument exact readings of what is being produced at the conditioning apparatus, and in spite of changes in the setting or control point of the conditioning apparatus. Consequently, it becomes possible to modify present pneumatic systems to embody the present invention and to use it under all conditions where pneumatic lines are available, and regardless of the presence or absence of explosion hazards.

It is to be understood that although particular instruments have been illustrated by way of example, equivalent types of instrument may be used to produce the result contemplated.

What is claimed is:

1. In a pneumatic telemetering system a source of pressure fluid; a pneumatic controlling device connected to said source and adapted to deliver pressure variable relative to a control point, said device having an adjustable control point determining the point at which said pressure varies; a pneumatic recording device arranged to record quantitatively the variable pressure delivered by said device and having relatively adjustable indicating elements; and means for simultaneously adjusting the control point of said device and readjusting said indicating elements relatively, to make the indications of said recording device correspond to the control point of said controlling device.

2. In a pneumatic telemetering system a source of pressure fluid; a pneumatic controlling device connected to said source and adapted to deliver pressure variable relative to a control point, said device having an adjustable control point determining the point at which said pressure varies; a pneumatic recording device arranged to record quantitatively the variable pressure delivered by said pneumatic controlling device and having a relatively adjustable scale and pointer; and pneumatic means for simultaneously adjusting the control point of said controlling device and readjusting said scale and pointer relatively to make the indications of said recording device correspond to the control point of said controlling device.

3. In a pneumatic telemetering system a source of pressure fluid; a pneumatic controlling device connected to said source and adapted to deliver a secondary pressure which is variable relative to a control point and as a function of an atmospheric condition to be controlled, said device having an adjustable control point determining the point at which said pressure varies; means for varying said condition in response to variations in said secondary pressure; a pneumatic recorder arranged to indicate said condition quantitatively in response to variations in said secondary pressure and having relatively adjustable indicating elements; and means for simultaneously adjusting the control point of said device and readjusting said indicating elements relatively to make the indications of said recorder correspond to the control point of said device.

4. In a pneumatic telemetering system a source of pressure fluid; a pneumatic controlling device connected to said source and adapted to deliver a secondary pressure which is variable relative to a control point and as a function of an atmospheric condition to be controlled, said device having an adjustable control point determining the point at which said pressure varies; means for varying said condition in response to variations in said secondary pressure; a pneumatic recorder arranged to indicate said condition quantitatively in response to variations in said secondary pressure and having a relatively adjustable scale and pointer; and pneumatic means for simultaneously adjusting the control point of said device and readjusting said scale and pointer relatively to make the indications of said recorder correspond to the control point of said device.

5. In a pneumatic telemetering system a source of pressure fluid; a pneumatic controlling device connected to said source and adapted to deliver pressure variable relative to a control point, said device having an adjustable control point determining the point at which said pressure varies; a pneumatic recorder arranged to indicate quantitatively the variable pressure delivered by said device and having relatively adjustable indicating elements; and pressure adjusting means located at a point remote from both said controlling device and said recorder for simultaneously adjusting the control point of said device and readjusting said indicating elements relatively to make the recorder indications correspond to the device control point.

6. In a pneumatic telemetering system a source of pressure fluid; a pneumatic controlling instrument connected to said source and adapted to deliver pressure variable relative to a control point, said instrument having an adjustable control point determining the point at which said pressure varies; a pneumatic recorder arranged to record quantitatively the variable pressure delivered by said device and having relatively adjustable indicating elements; and pressure adjusting means mechanically connected with said recorder for simultaneously adjusting the control point of said instrument and readjusting said indicating elements relatively to make the recorder indications correspond to the instrument control point.

7. In a pneumatic telemetering system a source of pressure fluid; a pneumatic controlling instrument connected to said source and adapted to deliver pressure variable relative to a control point, said instrument having an adjustable control point determining the point at which said pressure varies; a pneumatic recorder arranged to indicate quantitatively the variable pressure delivered by said device and having relatively adjustable indicating elements; and pressure adjusting means mechanically connected with said controlling instrument for simultaneously adjusting the control point of said instrument and readjusting said indicating elements relatively to make the recorder indications correspond to the instrument control point.

CARL A. OTTO.